(12) United States Patent
Feinauer et al.

(10) Patent No.: US 7,384,221 B2
(45) Date of Patent: Jun. 10, 2008

(54) MACHINE TOOL

(75) Inventors: Achim Feinauer, Göppingen (DE);
Hans Straub, Bad Ueberkingen (DE);
Wolfgang Bieg, Donzdorf (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 235 days.

(21) Appl. No.: 10/922,614

(22) Filed: Aug. 20, 2004

(65) Prior Publication Data
US 2005/0084354 A1 Apr. 21, 2005

Related U.S. Application Data

(63) Continuation of application No. PCT/EP03/01645, filed on Feb. 19, 2003.

(30) Foreign Application Priority Data
Feb. 21, 2002 (DE) ................................ 102 08 572

(51) Int. Cl.
*B23B 41/00* (2006.01)
(52) U.S. Cl. ............................ 408/56; 408/89; 408/97; 408/110; 408/236; 483/55
(58) Field of Classification Search ............ 408/54–56, 408/57, 88, 89, 97, 110, 234, 236, 705
See application file for complete search history.

(56) References Cited
U.S. PATENT DOCUMENTS

| 1,660,363 | A | * | 2/1928 | Sterling et al. ............. 408/117 |
|---|---|---|---|---|
| 3,806,691 | A | * | 4/1974 | Roach ...................... 219/69.16 |
| 4,589,174 | A | | 5/1986 | Allen |
| 5,300,006 | A | | 4/1994 | Tanaka et al. |
| 5,544,985 | A | * | 8/1996 | Lane ............................ 408/56 |
| 5,727,296 | A | * | 3/1998 | Kobler ....................... 29/27 C |
| 5,759,140 | A | | 6/1998 | Egbert |
| 6,066,078 | A | * | 5/2000 | Koelblin et al. .............. 483/55 |
| 6,228,007 | B1 | * | 5/2001 | Quak et al. ................... 483/56 |
| 6,357,094 | B1 | | 3/2002 | Sugimoto |
| RE37,794 | E | | 7/2002 | Egbert |
| 6,485,401 | B2 | * | 11/2002 | Gorrochategui ................ 483/1 |
| 2002/0137611 | A1 | * | 9/2002 | Komine ....................... 483/27 |
| 2004/0101375 | A1 | | 5/2004 | Budde et al. |

FOREIGN PATENT DOCUMENTS

DE            30 36 995 A1     4/1982

(Continued)

*Primary Examiner*—Monica Carter
*Assistant Examiner*—J Williams
(74) *Attorney, Agent, or Firm*—Alston & Bird LLP

(57) ABSTRACT

The invention relates to a machine tool for introducing bores into a workpiece, said machine tool comprising a machine frame, a drilling tool holder which is arranged on the machine frame and has at least one tool spindle, and a workpiece carrier which is arranged on the machine frame, the boring tool holder and the workpiece carrier being displaceable in relation to each other in a direction of displacement. A longitudinal direction of the at least one tool spindle is oriented transversally in relation to a horizontal plane, and the drilling tool holder is arranged on the machine frame in such a way that it can be pivoted in relation to the workpiece carrier, so that inclined bores can be introduced into the workpiece.

44 Claims, 6 Drawing Sheets

FOREIGN PATENT DOCUMENTS

| | | |
|---|---|---|
| DE | 195 21 846 A1 | 12/1996 |
| DE | 100 27 509 A1 | 12/2001 |
| EP | 900627 A2 * | 3/1999 |
| EP | 1 114 694 A1 | 7/2001 |
| GB | 1 435 166 A | 5/1976 |
| JP | 01 281805 A | 11/1989 |
| JP | 02106208 A * | 4/1990 |
| WO | WO 02/05995 A1 | 1/2002 |

* cited by examiner

MACHINE TOOL

CROSS-REFERENCE TO RELATED APPLICATIONS

The present application is a continuation application of international application PCT/EP03/01645, filed Feb. 19, 2003, and also claims the benefit of German Application No. 102 08 572.2, filed Feb. 21, 2002, which are incorporated herein by reference in their entirety and for all purposes.

BACKGROUND OF THE INVENTION

The invention relates to a machine tool for introducing bores into a workpiece, comprising a machine frame, a drilling tool holder, which is disposed on the machine frame and has at least one tool spindle, and a workpiece carrier which is disposed on the machine frame, the drilling tool holder and workpiece carrier being displaceable relative to one another in a displacement direction.

Machine tools of this type are known from EP 1 052 048 A1 or U.S. Pat. No. 5,759,140. They are used in particular to produce oil hole bores (oil ducts) in crankshafts.

SUMMARY OF THE INVENTION

In accordance with the invention, a machine tool is provided which is easy to manufacture and can be operated in an advantageous way.

In accordance with the invention, a machine tool is provided wherein the drilling tool holder is positioned in such a way that a longitudinal direction of the at least one tool spindle is oriented transversely with respect to a horizontal plane, and the drilling tool holder is disposed on the machine frame such that it can pivot relative to the workpiece carrier, so that inclined bores can be introduced into the workpiece.

In accordance with the invention, inclined holes can be introduced into the workpiece by virtue of the drilling tool holder being brought into a desired pivot position relative to the machine frame and, therefore, relative to the displacement direction between workpiece carrier and drilling tool holder. The workpiece carrier itself then does not have to be pivoted relative to the machine frame. This allows the machine tool to be of simpler form and allows the displacement movement required for relative positioning between a workpiece and a drilling tool to be minimized.

In particular, the machine tool can be loaded with one or more workpieces and unloaded in a simple way, since the workpiece carrier is always horizontal (with respect to the direction of gravity).

The machine tool in accordance with the invention is particularly advantageous for the simultaneous machining of a plurality of workpieces. These workpieces can then be disposed horizontally alongside one another on the workpiece carrier. Since the latter itself only has to be moved linearly and does not have to be pivoted, it does not require any special structural outlay in particular with regard to the additional weight in the case of a plurality of workpieces. A displacement axis for a workpiece carrier carriage can, in this case, be placed beneath the latter, so that the mass is reduced and loading of the workpiece carrier is also simplified. In particular, it is possible to use a planar workpiece carrier carriage.

Since a longitudinal direction of the at least one tool spindle is oriented transversely, i.e., at an angle, with respect to a horizontal plane, it is possible in particular for the drilling tool holder to be equipped with a plurality of tool spindles and associated tools, which can then be disposed next to one another, i.e. do not have to be positioned vertically above one another.

It is then easy to carry out a drilling tool change, for example by providing a tool magazine carriage. The tool carrier can be displaced in such a way that the tool magazine carriage can be positioned with respect to the drilling tool holder and the drilling tool holder can carry out a drilling tool change in particular by means of an automatic pick-up process.

It is possible to carry out a drill bush change in a simple way, since a drill bush carrier can be positioned on the workpiece(s) in a simple way. It is then possible to use the optimum drill bush for the desired tool machining, and a drill bush change can be carried out in a simple way. It is possible in particular for deep holes to be introduced into the workpiece(s) in a simple way.

It is in principle possible to achieve a relative displacement between the drilling tool holder and the workpiece carrier by virtue of the drilling tool holder being displaced relative to the workpiece carrier, i.e., by virtue of the drilling tool holder being guided displaceably on the machine frame. However, it is particularly advantageous if the workpiece carrier is guided displaceably on the machine frame and is, in this case, formed as a workpiece carrier carriage.

Since the pivotability of the drilling tool holder means that the workpiece carrier carriage does not have to be pivoted, and therefore is in particular held non-pivotably on the machine frame, it is possible to implement displaceability of this type in a structurally simple way, for example by means of a linear guide. This also allows the mass of the object to be displaced to be minimized, since the drilling tool holder no longer has to be displaced in its entirety in the displacement direction relative to the workpiece, but rather only has to be pivoted relative to the displacement direction.

In particular, the workpiece carrier is guided in a horizontally displaceable manner. It can be loaded with one or more workpieces in a simple way, and the unloading operation can also be carried out in a correspondingly simple way. After a workpiece has been fixed to the workpiece carrier, its horizontal position no longer changes.

It is advantageous if the drilling tool holder can pivot about a pivot axis which is transverse and in particular at right angles with respect to the displacement direction between drilling tool holder and workpiece carrier. It is then possible for inclined holes to be introduced into the workpiece at any desired angle when the corresponding relative positioning is established. In particular, the pivot axis is in this case perpendicular to the displacement direction.

Furthermore, it is expedient if the pivot axis and the displacement direction define a horizontal plane. This horizontal plane is a fixed plane which is independent of the relative position between drilling tool holder and workpiece carrier.

In this context, the displacement direction and the pivot axis are each oriented perpendicular to a vertical direction (direction of gravity). The drilling tool holder can then be pivoted relative to this vertical direction, in order thereby to allow a defined pivot angle position to be produced with respect to the displacement direction.

It is advantageous if the drilling tool holder is pivotable continuously (steplessly) in a defined angle range about a vertical direction (direction of gravity) and any pivot position can thus be fixed within this angle range. It is then possible for inclined holes to be introduced at any desired angles within this angle range.

To allow inclined holes to be introduced as oil ducts in crankshafts, the defined angle range at least comprises the interval between −25° and +25° with respect to a vertical direction. By way of example, the drilling tool holder can be pivoted in an angle range between −35° and +35°.

It is very particularly advantageous if a workpiece can be fixed to the workpiece carrier in such a way that its longitudinal direction is oriented parallel to the displacement direction. This allows the horizontal position of the workpiece to be fixed with respect to the machine frame, so that this horizontal position remains unchanged after clamping to the workpiece carrier. The introduction of inclined holes is then effected by a suitable inclined positioning of the drilling tool holder relative to the workpiece carrier.

Good positioning between drilling tool and workpiece can be achieved if a workpiece can be fixed to the workpiece carrier such that it can rotate about an axis of rotation. As a result, the workpiece in the workpiece carrier can be rotated into a corresponding position in order to allow the drilling tool to be applied to a desired point on the periphery. The longitudinal relative position is produced by the relative movement between the drilling tool holder and the workpiece carrier in the displacement direction.

It is particularly expedient if the axis of rotation about which a workpiece is rotatably fixed to the workpiece carrier is oriented parallel to the displacement direction of the workpiece carrier. As a result, a rotation of the workpiece on the workpiece carrier does not produce any pivoting movement with respect to the displacement direction or vertical to this displacement direction, i.e., when a defined angular position of the drilling tool holder has been set, the relative angular position with respect to the workpiece is retained when the latter is clamped in its longitudinal direction lying on the axis of rotation on the workpiece carrier.

Furthermore, it is particularly expedient if a pivot axis of the drilling tool holder and/or a longitudinal axis of the workpiece intersects the axis of rotation or runs transversely to and at a short spacing from the latter. The result of this is that, irrespective of the angular position, the longitudinal axis of the tool spindle and therefore the longitudinal axis of the drilling tool always intersects the axis of rotation at the same point. As a result, it is in turn possible to introduce inclined bores into a workpiece while minimizing the displacement travel.

The drilling tool holder, in any pivot position, can expediently be displaced in a direction which is parallel to the longitudinal direction of the at least one tool spindle, in order thereby to allow a corresponding to and fro movement to be carried out in order to produce the hole.

Furthermore, it is provided that the drilling tool holder can be displaced in the direction of a pivot axis of the drilling tool holder. This direction is then a transverse direction and in particular a right-angled direction with respect to the displacement direction (between drilling tool holder and workpiece carrier). In this way, the drilling tool holder can also be positioned in this transverse direction, in order in this way, for example, also to allow eccentric bores to be formed on a workpiece. In particular, this transverse displacement can be carried out in any pivot position of the drilling tool holder.

The drilling tool holder can be equipped with a plurality of tool spindles disposed parallel to one another, in order in this way to enable a corresponding plurality of drilling tools to be provided. In this context, it is possible in particular to provide more than two drilling tools. As a result, it is in turn possible for a plurality of workpieces to be machined simultaneously, it being possible for the same type of inclined holes to be introduced into a plurality of workpieces simultaneously.

It is then likewise expedient if a plurality of workpieces can be fixed to the workpiece carrier, in which case it is advantageous, when machining a plurality of workpieces, for these workpieces to be fixed horizontally next to one another on the workpiece carrier. The machine tool according to the invention allows the tool spindles to be disposed alongside one another on the drilling tool holder, so that as a result the vertical construction of the machine tool is not increased in size.

In one embodiment of the machine tool according to the invention, a relative rotation between the workpiece and the drilling tool is provided, in order to position a drilling tool relative to a workpiece, by virtue of the workpiece being rotatable about a longitudinal axis relative to the workpiece carrier and by virtue of the drilling tool being pivotable, by means of the drilling tool holder, relative to the workpiece carrier.

In particular, a drilling tool is formed as a deep-hole drilling tool, so that, for example, oil ducts, the length of which is considerably greater than their diameter, can be introduced into a crankshaft.

It is then expedient if, for each drilling tool, a drill bush can be positioned with respect to the workpiece. A drill bush of this type, within which the drilling tool is guided displaceably and in rotation, in particular prevents slipping when the drilling tool is placed on the workpiece. A drill bush also allows the accuracy with which the drilling tool is guided to be increased, in order thereby to ensure a highly accurate bore is drilled. This makes it possible in particular to carry out a deep-hole drilling process.

By way of example, it is possible to provide for the positioning of the at least one drill bush for placing against the workpiece to be NC-controlled. If there is a plurality of drilling tools, a drill bush plate which has a plurality of drill bushes can be used for this purpose.

As an alternative or in addition, it is possible to provide for the positioning of the at least one drill bush to be effected resiliently against the associated workpiece, for example by the drill bush being pressed on by means of an elastic element or being pressed on hydraulically.

It is also possible to provide for the positioning of the at least one drill bush to be effected by means of a drill bush carriage which can move relative to the machine frame and which holds one or more drill bushes. The movability makes it possible to ensure that the drill bush is positioned on the workpiece. It is also possible to provide for the drill bush to be displaceable from the drilling tool holder in order, for example, to allow it to be changed.

In a variant of one embodiment, it is provided that the drill bush carriage is moved in a controlled manner relative to the drilling tool holder. It is also possible to provide for the drill bush carriage to be moved in a controlled manner relative to the machine frame. In the former case, a relative movement proceeds from the drilling tool holder, whereas in the latter case a relative movement proceeds from the system of coordinates of the machine frame.

In particular when producing deep holes, a cooling/rinsing fluid flows through the drilling tool. This fluid is responsible for internal cooling of the drilling tool and also emerges from the latter and discharges drilling chips from a drilling working zone. The cooling/rinsing fluid is passed through the drilling tool under pressure.

It is advantageous for a drill bush to be formed in such a way, in particular by means of its front end for bearing against the workpiece, and to be adapted to the workpiece, in such a way that, when it is placed onto the workpiece, a seal is produced preventing cooling/rinsing fluid from flowing out. As a result, it is then possible to produce a cooling/rinsing fluid circuit in which fresh cooling/rinsing fluid is pumped through the drilling tool into a drilled bore and then flows back, carrying with it drilling chips without a significant amount of the cooling/rinsing fluid escaping between the workpiece and the drill bush and thereby leaving the system.

Furthermore, it is expedient if the workpiece carrier is provided with at least one bearing device (abutting device) for a workpiece, which can be brought to bear against the workpiece in the region where a drill breaks through, in order to block cooling/rinsing fluid from flowing out. If a drill breaks through the workpiece, the cooling/rinsing fluid, which is in particular forced through the drilling tool under a high pressure, would then pass through where the drill has broken through and leave the system. The bearing device allows this location where the drill breaks through to be closed to the cooling/rinsing fluid, in order to prevent it from bursting through in this way.

Therefore, the bearing device allows the cooling/rinsing fluid circuit to be closed when the drill breaks through, in order to allow cooling/rinsing fluid to be recycled.

In particular, it is provided that the bearing device has a seal for bearing against the workpiece. This may, for example, be an axially elastic sealing element which is responsible for corresponding sealing.

Furthermore, it is expedient if the seal is disposed at a blind bore. This blind bore can receive the drilling tool when it emerges from the location where it breaks through. One end of the blind bore is responsible for reversing the direction of flow of the cooling/rinsing fluid in order to recycle it.

In a variant of one embodiment, it is provided that a tool magazine is guided such that it can be displaced in the displacement direction of the workpiece carrier. The workpiece carrier can then be guided away from the drilling tool holder in order to carry out a tool change, with the tool magazine then being guided to the drilling tool holder. A tool change can be carried out by suitable to and fro movements. The tool magazine and workpiece carrier may be displaceable synchronously with one another by being coupled to one another, in particular being mechanically coupled to one another.

The following description of preferred embodiments, in conjunction with the drawings, serves to provide a more detailed explanation of the invention.

BRIEF DESCRIPTION OF THE DRAWINGS

Preferred exemplary embodiments of the invention are explained in more detail hereinbelow with reference to schematic drawings, in which.

DETAILED DESCRIPTION OF THE INVENTION

Figure 1:
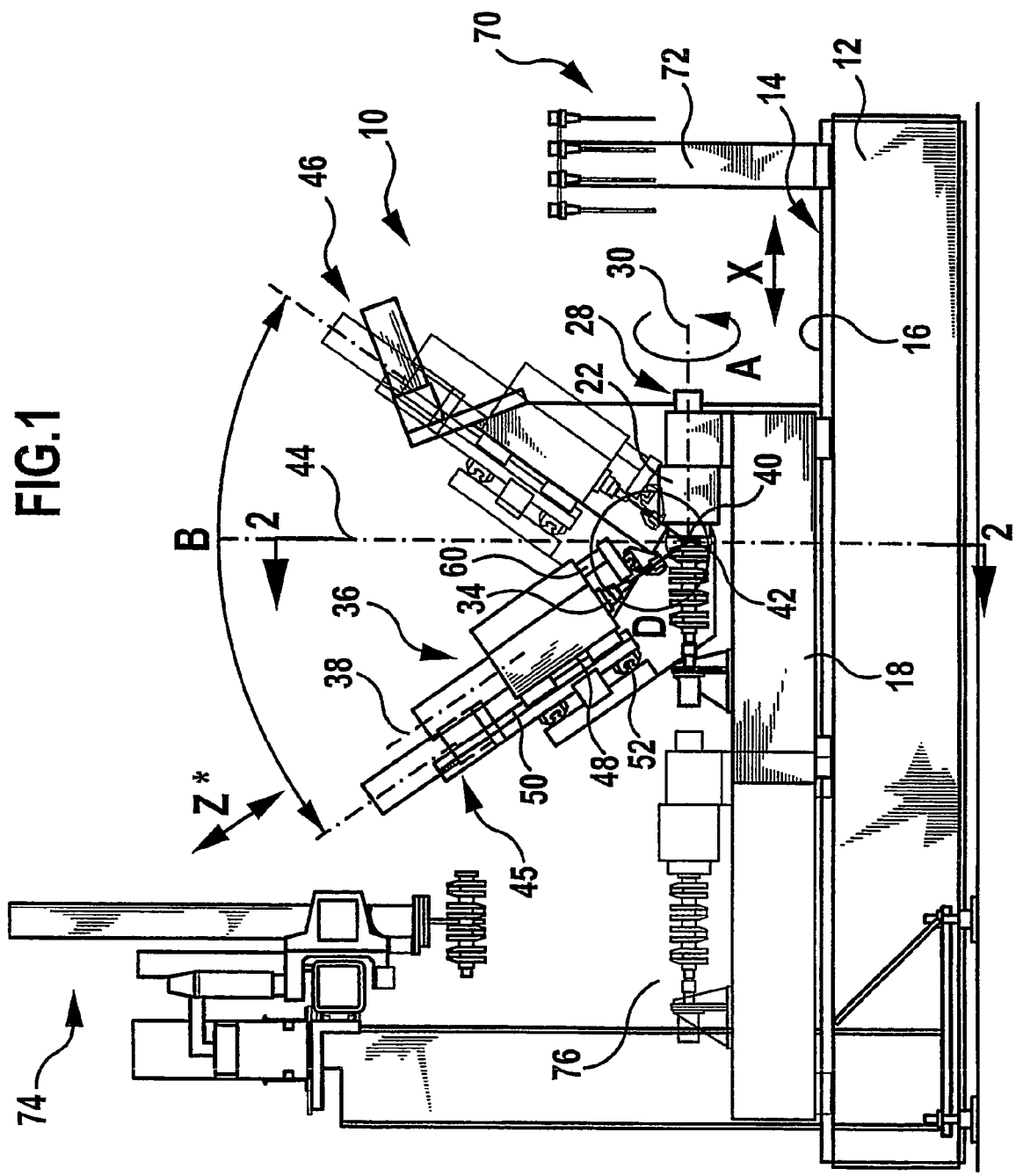
FIG. 1 shows a diagrammatic side view of an exemplary embodiment of a machine tool according to the invention.

An exemplary embodiment of a machine tool according to the invention, which is denoted overall by 10 in FIG. 1, includes a machine frame 12. A linear guide 14 which, by way of example, comprises two guide rails 16 that are spaced apart from one another and aligned parallel to one another, is disposed on this machine frame 12. These guide rails extend in a direction X which is directed horizontally over the machine frame 12, i.e., is at right angles to the direction of gravity.

A carriage 18 as workpiece carrier is guided displaceably in the linear guide 14 on the guide rails 16, i.e., is guided in a linearly displaceable manner in direction X. For this purpose, guide shoes 20 (shown in FIG. 2), which engage the guide rail 16, are disposed on the carriage as coupling elements.

By way of example, it is possible to provide for the workpiece carrier carriage 18, in its displacement movement in the direction X, to be driven by means of a ball screw drive, to be hydraulically driven or to be driven by means of linear motors (with the guide rail 16 and the coupling elements 20 then being configured correspondingly).

Figure 2:
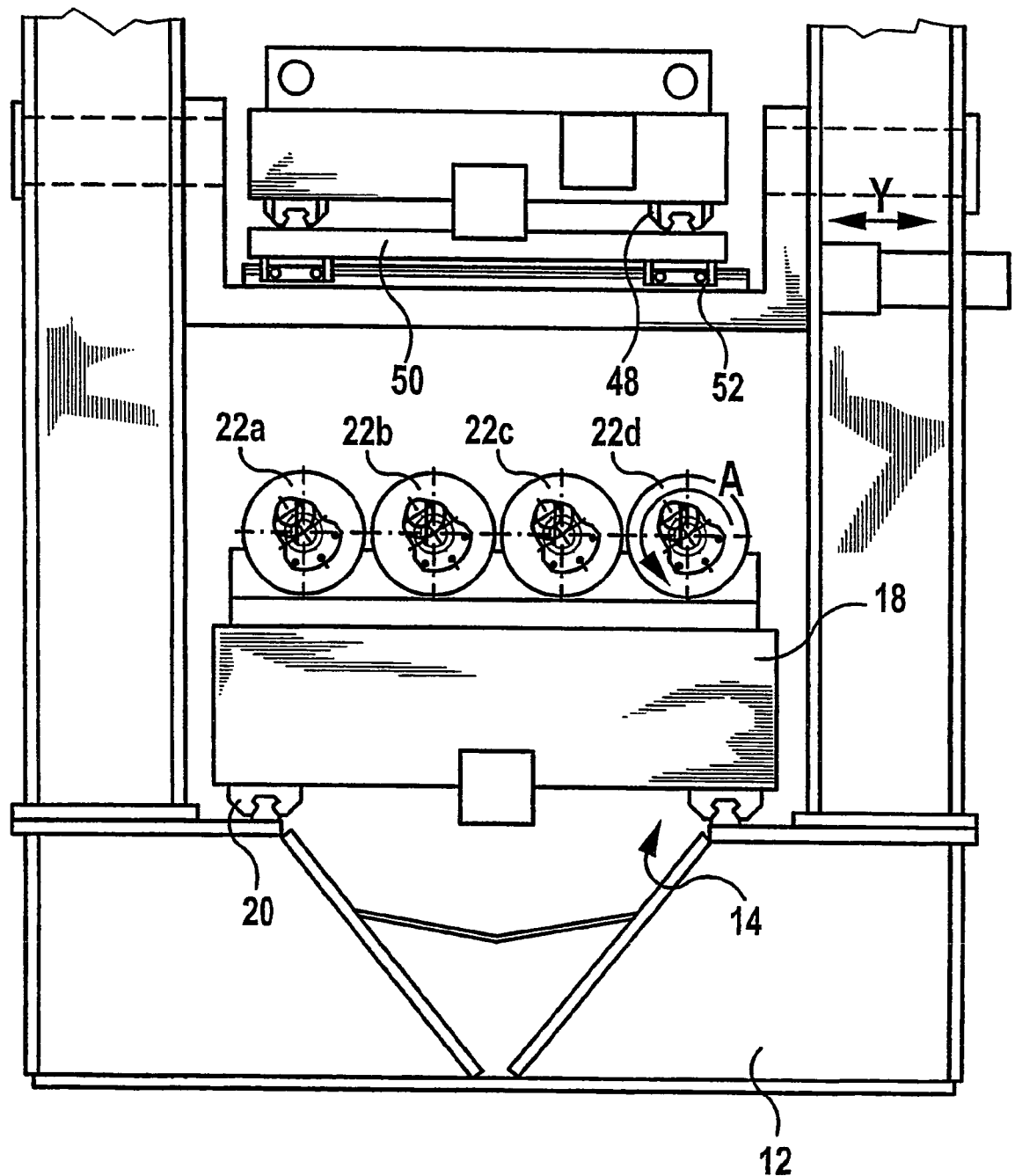
FIG. 2 shows a sectional view on line 2-2 from FIG. 1.

A workpiece 22 can be fixed on the workpiece carrier 18 in order to be machined; in particular, it is possible for a plurality of workpieces, and especially more than two workpieces, which can then be machined synchronously, to be fixed to the workpiece carrier 18 (workpieces 22a, b, c, d in FIG. 2).

Figure 3:
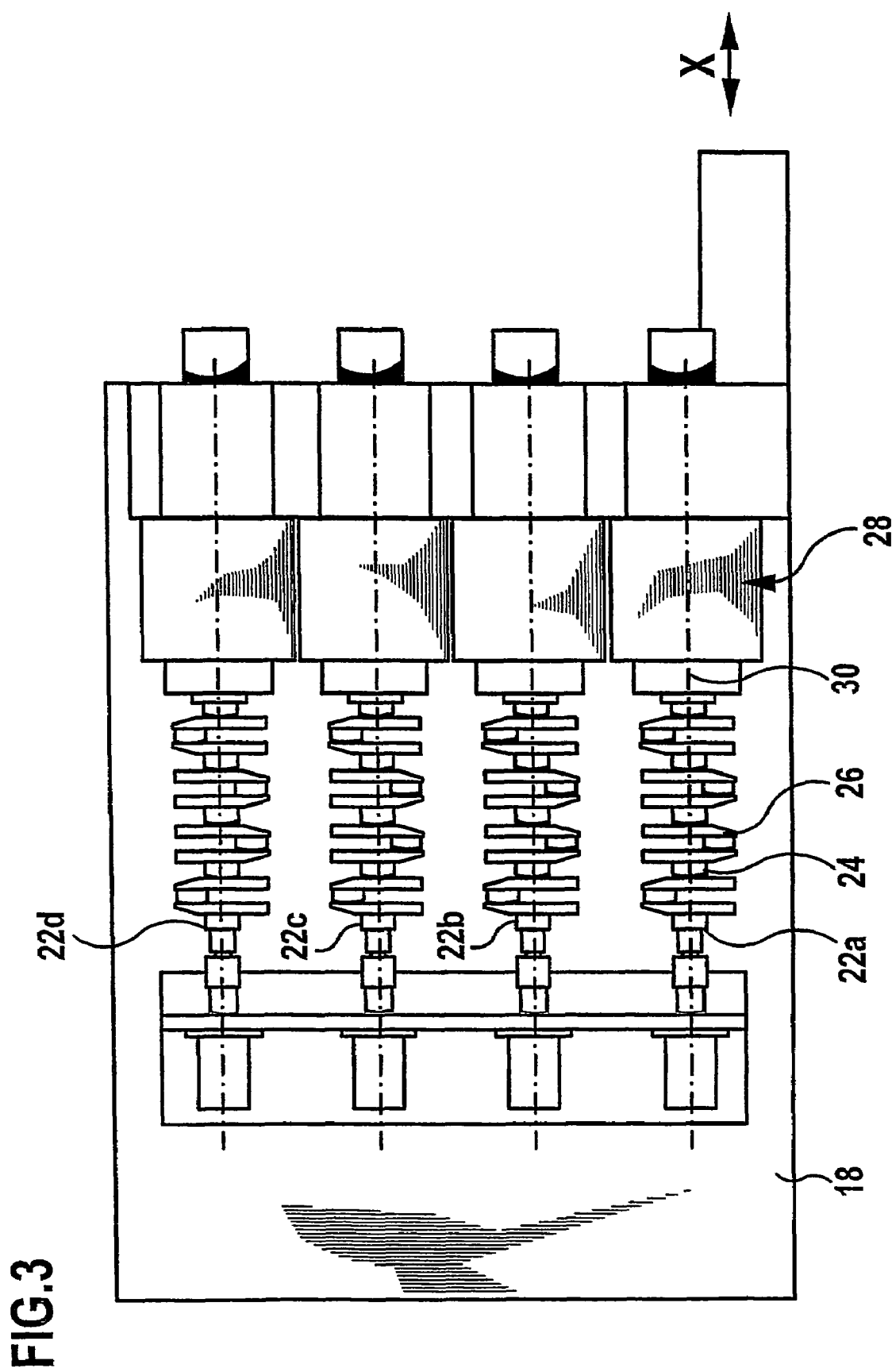
FIG. 3 shows a plan view of a workpiece carrier of the machine tool shown in FIG. 1.

The workpieces 22 are, for example, crankshafts with main bearings 24 and crankpin bearings 26 at a spacing therefrom (FIG. 3). The machine tool according to the invention allows oil ducts to be introduced between adjacent main bearings 24 and crankpin bearings 26, i.e., oil ducts of this type can be introduced as inclined bores. In particular, it is possible to produce deep bores, the drilled depth of which is considerably greater than the diameter of the bore.

For each workpiece 22, the workpiece carrier 18 has a holding device 28, by means of which the corresponding workpiece 22 can be fixed to the workpiece carrier 18. A holding device 28 of this type is formed in such a way that a workpiece 22 can rotate about an axis of rotation 30 relative to the workpiece carrier 18, in order in this way to allow a defined surface region for the initiation of a bore to be positioned relative to the workpiece carrier 18. The axis of rotation 30 is in this case aligned parallel to the displacement direction X of the workpiece carrier 18. A workpiece 22 can pivot through a pivot angle A with respect to a starting position about the axis of rotation 30. A workpiece 22 is in particular clamped into the holding device 28 in such a way that a longitudinal direction coincides with the axis of rotation 30. In the case of a crankshaft, therefore, a central axis of the main bearing 24 is aligned coaxially with the axis of rotation 30.

In the case of a plurality of clamped workpieces 22a, 22b, 22c, 22d (FIG. 3), the respective axes of rotation of the associated holding device 28 are aligned parallel to one another and are in a horizontal plane.

To introduce the bores into a workpiece 22, there is provided at least one drilling tool 32 (shown in FIG. 4), which is driven by an associated tool spindle 34. The drilling tool 32 is held via the tool spindle 34 on a drilling tool holder 36, which can move pivotably relative to the workpiece carrier 18 but is fixedly seated on the machine frame 12 with respect to the displacement direction X.

A longitudinal direction 38 of the tool spindle 34 is oriented transversely, i.e. at an angle with respect to the displacement direction X and in particular is oriented transversely with respect to the horizontal plane encompassed by the displacement direction X. The longitudinal direction 38 of the tool spindle 34 therefore intersects this horizontal plane, i.e. lies parallel to or at an angle other than 90° with respect to the vertical.

The drilling tool holder 36 is disposed pivotably on the machine frame 12, with a corresponding pivot bearing 40 being disposed in such a way with respect to the machine frame that a pivot axis 42 is oriented transversely and in particular perpendicular with respect to the displacement direction X (and therefore to the axis of rotation 30). It is advantageous if the pivot axis 42 intersects the axis of rotation 30 or at least is located transversely to it in the vicinity thereof.

By means of this pivot bearing 40, the drilling tool holder 36 and therefore the drilling tool 32 can be pivoted in a defined angle range about the pivot axis 42 relative to the machine frame 12 and therefore to the workpiece carrier 18. By way of example, the pivot bearing 40 is formed in such a way that the drilling tool holder 36 is pivotable steplessly in a pivot range between −35° and +35° with respect to a vertical direction 44 (which is parallel to the direction of gravity). A defined pivot position within this range can be fixed, in order to prevent deviations in direction during the penetration of a drilling tool into a workpiece 22. This fixing of a defined pivot position is effected, for example, by NC control. The pivotability of the drilling tool holder 36 about the pivot axis 42 is indicated by the pivot angle B in FIG. 1. This shows a first position 45 and a second pivot position 46, with these two positions 45 and 46 differing by virtue of the pivot angle with respect to the vertical axis 44.

The drilling tool holder 36 is formed in such a way that in any pivot position the tool spindle 34 is displaceable in its longitudinal direction 38 and therefore the drilling tool 32 is displaceable in a direction $Z^*$ which coincides with or is parallel to this longitudinal direction 38. This to and fro movement allows the drilling tool 32 to be fed onto a workpiece 22 and, given suitable further guidance, allows the workpiece to be drilled through.

To provide the displaceability of the tool spindle 34 on the drilling tool holder 36 in the direction $Z^*$, a displacement guide 48 is provided. The corresponding movement of the tool spindle 34 is driven, for example, by means of a ball screw drive, hydraulically or by means of linear motors.

Furthermore, it is also possible to provide for the tool spindle 34 to be movable in a direction Y transversely with respect to the displacement direction X (FIG. 2), i.e., for the drilling tool holder 36 to include a corresponding carriage 50, on which the tool spindle 34 is in turn guided, in order to achieve this very displaceability in the transverse direction Y. By means of this carriage 50, the drilling tool 32 can be displaced transversely with respect to the axis of rotation 30 (or with respect to the longitudinal axis of the workpiece 22), in order in this way, for example, to produce eccentric bores. The carriage 50 may, for example, be driven by means of a ball screw drive or hydraulically or by means of linear motors. A corresponding displacement guide 52 is provided for the displaceability.

For simultaneous machining of a plurality of workpieces 22a, 22b, 22c, 22d, it is possible to provide for the drilling tool holder 36 to carry a corresponding plurality of tool spindles 34 with associated drilling tools 32, for example four tool spindles 34 with parallel longitudinal directions 38 for the simultaneous machining of four workpieces 22.

These tool spindles 34 are preferably coupled to one another in such a manner that the to and fro movement $Z^*$ is carried out jointly and the transverse movement in the displacement direction Y is also carried out jointly. The corresponding drives of the drilling tool holder 36 therefore allow identical bores to be formed, for example, in all four workpieces 22a, 22b, 22c, 22d simultaneously, provided that these workpieces 22 are identical in form and are clamped to the workpiece carrier 18 in identical ways.

Figure 4:
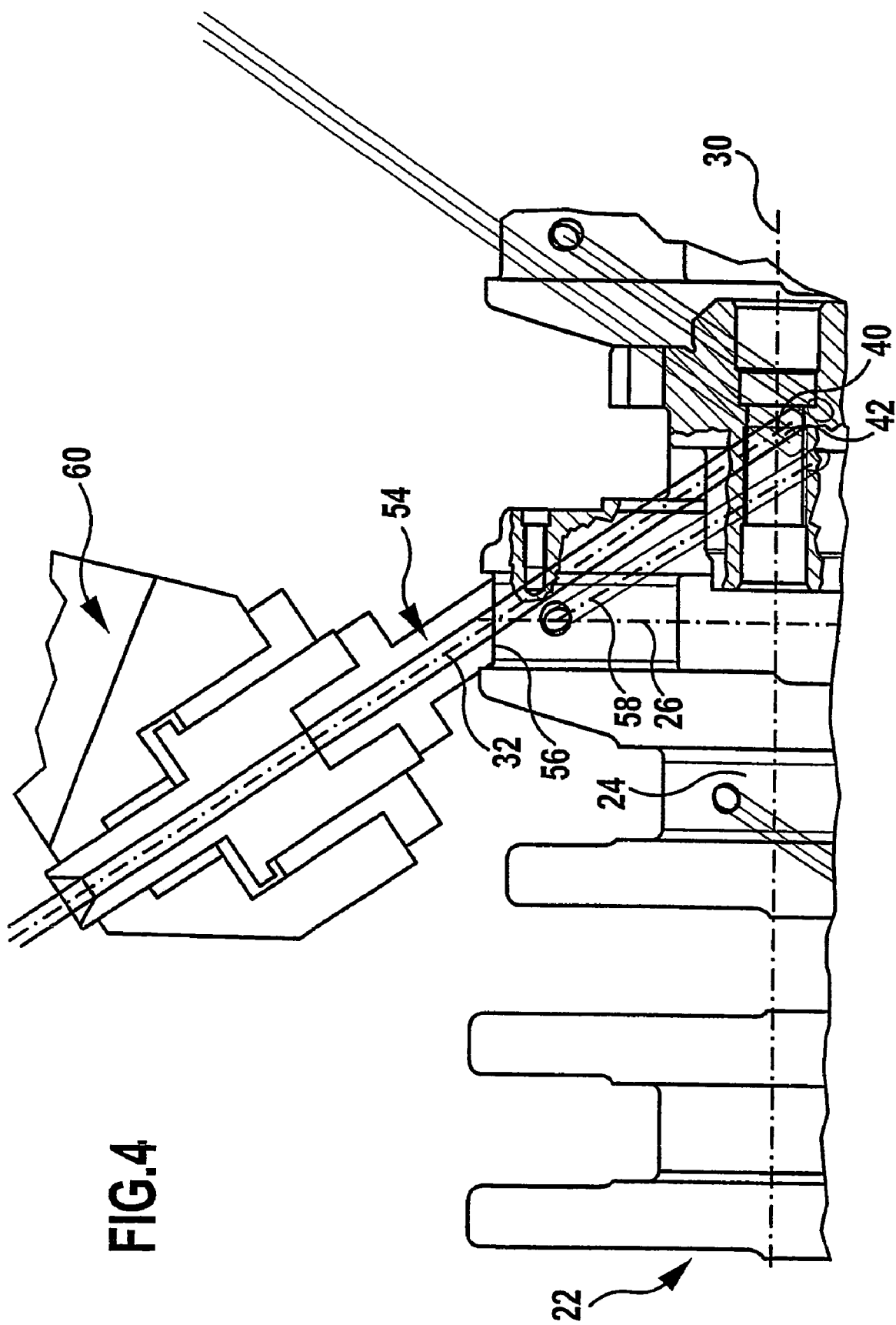
FIG. 4 shows a detail view of area D from FIG. 1.

As shown in FIG. 4, to prevent slipping when a respective drilling tool 32 is being placed on the associated workpiece 22, a drill bush 54 is associated with each drilling tool 32. The drilling tool 32 is guided in rotation in a drill bush 54 of this type. Furthermore, it is guided in a longitudinally displaceable manner in the direction $Z^*$ in the drill bush.

In particular a front end 56 of the drill bush 54 is adapted to the workpiece 22 in such a manner that when an inclined bore 58 is being introduced at a defined angle to the horizontal plane, the drill bush can be applied to the workpiece 22, i.e., by way of example, can be applied to a crankpin bearing 26 of a crankshaft.

In particular in order to introduce deep bores, the drilling tool 32 is internally cooled. The coolant in this case simultaneously serves as a rinsing fluid which entrains drilling chips and thereby removes them from the working zone of the drilling tool 32 on the workpiece 22. In particular, the cooling/rinsing fluid is pumped through the drilling tool 36 at a suitable pressure, thereby ensuring sufficient removal of chips from the drilling working zone. Adapting the front end 56 to the workpiece 22 enables the circuit for supplying and discharging cooling/rinsing fluid to be substantially closed when the front end 56 of the drill bush 54 is correspondingly pressed against the workpiece 22, i.e., cooling/rinsing fluid is substantially prevented from escaping in the region of the contact surface between the front end 56 of the drill bush 54 and the workpiece 22.

In this context, the drill bush 54 is in particular exchangeable, so that if a different workpiece 22 is used, the corresponding sealing action can be achieved by means of a correspondingly adapted drilling bush 54.

As an alternative or in addition, it is also possible to provide for the drill bush 54, at its front end 56, to carry a sealing element (not shown), such as an axially elastic seal, in order thereby to provide the sealing action.

The drill bush 54 can be positioned relative to the workpiece 22 by means of a drill bush guide 60. In this way, it is possible in particular for the front end 56 to be pressed onto the workpiece 22.

By way of example, it is possible to provide for the drill bush 54 to be guided resiliently against the workpiece 22 by means of the drill bush guide 60, for example by the application of hydraulic pressure.

It is also possible to provide for the drill bush 54 to be seated on a carriage which, in turn, can move relative to the machine frame 12 and in particular relative to the drilling tool holder 36. The drilling tool 32 and drill bush 54 can then be optimally positioned with respect to the workpiece 22 by means of a double carriage technique; namely, carriage guidance for the tool spindle 34 and further carriage guidance for the drill bush 54.

In this case, the positioning of the drill bush 54 relative to the workpiece 22 is in particular NC-controlled. This control in turn is preferably effected with respect to the drilling tool holder 36 and in particular in terms of the $Z^*$ direction.

In addition, it is also possible to provide a transverse movability (parallel to the Y direction), in order in particular to make it easy to change the drill bush 54.

As an alternative, however, it is also possible to provide for the control of the drill bush positioning 54 to be effected relative to the machine frame 12.

If there is a plurality of drilling tools 32 on the drilling tool holder 36, the drill bushes 54 which are respectively associated with the drilling tools 32 are in particular combined in a drill bush plate which is positioned with respect to the workpiece 22. Positioning this drill bush plate in particular in the $Z^*$ direction then automatically positions all the drill bushes 54 associated with the respective drilling tools 32.

Figure 6:
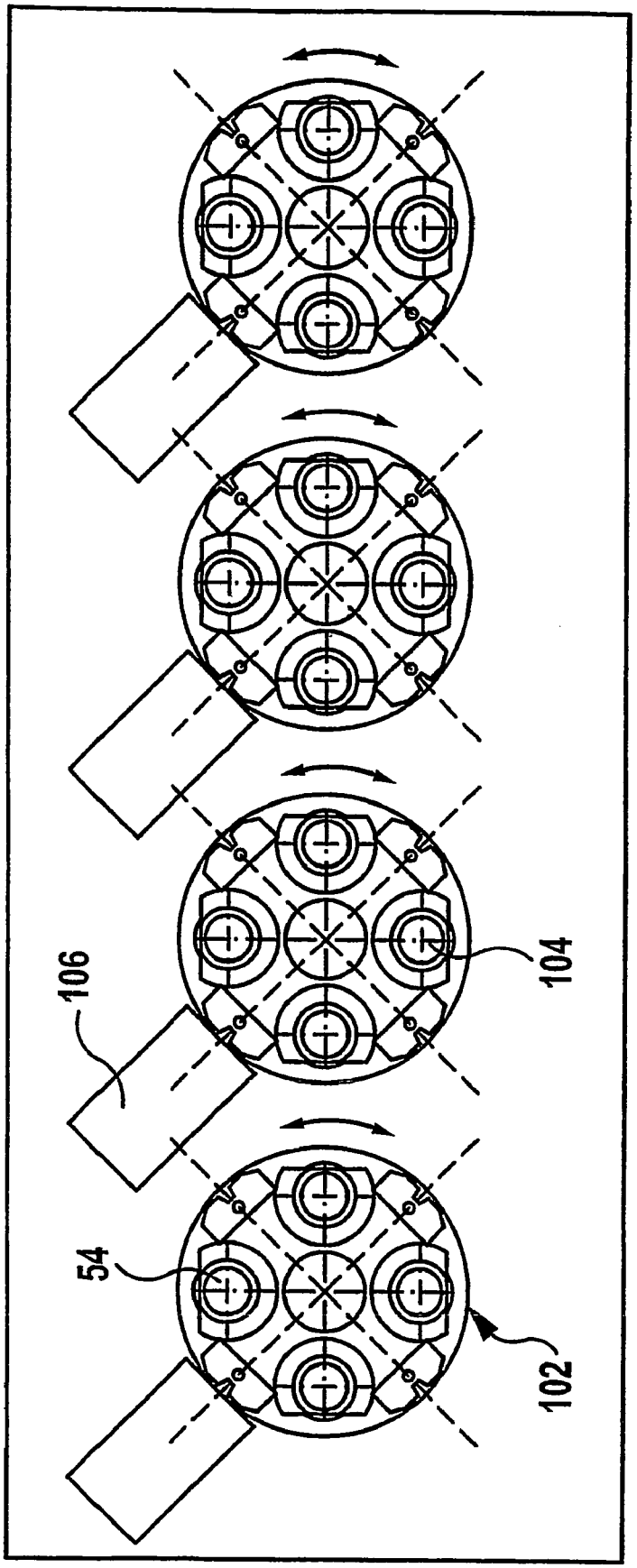

It is also possible to provide for the drill bushes 54 to be held on a drill bush carrier 100 (FIG. 6). In this case, the drill bush carrier 100 integrates a plurality of drill bushes 54 for a plurality of drilling tools 32. By means of the drill bush carrier 100, all the drill bushes 54 move together, so that the whole set of drill bushes 54 can be positioned with respect to the plurality of drilling tools 32. The drilling bush carrier is displaceable in particular in the $Z^*$ direction, in order to allow the drill bushes 54 to be placed onto the workpieces 22.

It is also possible to provide for the drill bush carrier 100 to be displaceable in all three spatial directions relative to the machine frame 12.

In the exemplary embodiment shown in FIG. 6, the drill bush carrier 100 comprises a plurality of drill bush plates 102, with each drill bush plate 102 being associated with the corresponding drilling tool of the plurality of drilling tools 32. A drill bush plate 102 in turn comprises a plurality of drill bushes 104. In the exemplary embodiment shown, four drill bushes 104 are provided per drill bush plate 102.

The drill bush plates 102 are disposed rotatably on the drill bush carrier 100, it being possible in particular to latch defined rotational positions, namely the rotational positions in which the corresponding drilling tools can be moved into the associated drill bushes 104. A motor 106 is in each case provided to drive the rotary movement.

A drill bush change can be carried out, in association with each drilling tool 32, above the drill bush plates 102 of the drill bush carrier 100, i.e., it is possible to use the drill bush 104 which is adapted to the particular location on the corresponding workpiece 22 when a hole is to be introduced using the corresponding drilling tool 32.

It is possible to provide that if there is a plurality of drill bush plates, as shown in FIG. 6 (which shows four drill bush plates), the rotary movement of these drill bush plates can be synchronized with one another, so that in the event of a drill bush change associated with one drilling tool 32, a drill bush change also takes place for the remaining drilling tools. By means of the drill bush carrier 100, the set of drill bush plates 102 can be positioned with respect to the drilling tools 32.

It is also possible to provide that the drill bush carrier be formed in the manner of a slide and different drill bushes can be positioned at a workpiece 22 as a function of the sliding position relative to the drilling tools 32.

Figure 5:
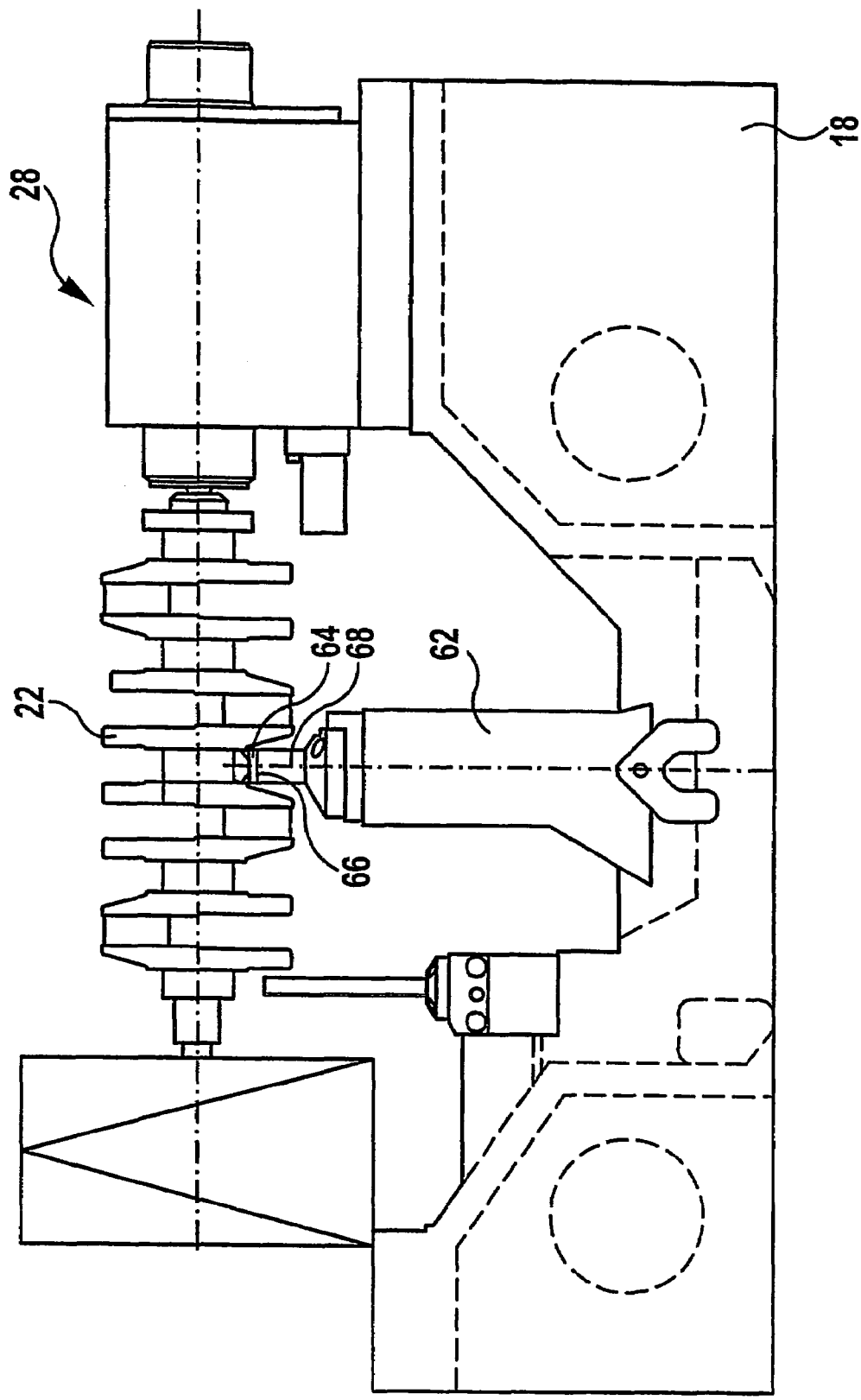
FIG. 5 shows a lateral sectional view of a workpiece carrier with a bearing device according to the invention, and FIG. 6 diagrammatically depicts a drill bush carrier which holds a plurality of drill bush plates.

In a variant of an embodiment which is diagrammatically depicted in FIG. 5, a bearing device 62 is provided for the workpiece 22, this bearing device being mounted on the workpiece carrier 18 and providing a bearing or abutement surface 64 which bears (abuts) against a side of the workpiece 22 which is remote from a drilling starting point. This bearing surface 64 is positioned, by means of the bearing device 62, in the region in which the drill break-through takes place when the drilling tool 32 has penetrated all the way through the workpiece 22, i.e. at which the drilling tool 32, with respect to the direction $Z^*$, emerges at that end of the workpiece 32 which is remote from the drilling starting point.

Since the cooling/rinsing fluid is passed through the drilling tool 32 under pressure and emerges at the front end or in the region of the front end thereof, so that it flows into the drill passage in order to in turn enable drilling chips to be discharged therefrom, this fluid flows out under high pressure when the drill breaks through. The bearing device 62 can prevent this fluid from leaving the system by sealing off this very point where the drill breaks through. For this purpose, a sealing element 66, such as for example an axially elastic seal, is disposed at the bearing surface 64. This seal seals off a receiving space 68, such as for example a blind bore, into which a front end of the drilling tool 32 can move when it breaks through, in order to obtain a breakthrough which is as far as possible free of any burrs. However, the bearing device 62 then closes the cooling/rinsing fluid circuit, since it is impossible for any cooling/rinsing fluid to flow out of the sealed receiving space 68 into the outside space, but rather this fluid has to flow back via the drilled passage produced. This substantially avoids the loss of cooling/rinsing fluid from the system. In particular, the cooling/rinsing fluid is prevented from flowing out of the system under high pressure together with drilling chips, which may have sharp edges.

In this context, it is possible to provide for a bearing device 62 itself to be held movably and fixably on the workpiece carrier 18, in order thereby to realize corresponding positioning on the workpiece 22. In particular, it is possible to provide for displaceability parallel to the displacement direction X of the workpiece carrier 18 and/or displaceability perpendicular thereto in the vertical direction 44. In the same way as a drill bush change is possible as described above, it is also possible to change bearing bushes, for example by providing a displaceable bearing bush carrier or a bearing bush carrier which has rotatable bearing bush plates, with the bearing bush plates in turn holding bearing bushes.

If a plurality of workpieces 22 are being machined simultaneously, a corresponding plurality of bearing devices 62 are provided.

To make it easy to change drilling tools 32, a tool magazine 70 is provided. This magazine is in particular formed in such a way as to be displaceable in the displacement direction X of the workpiece carrier 18. For this purpose, a corresponding slide 72 can be provided, the said slide being guided on the linear guide 14 independently of the workpiece carrier 18. However, the carriage 72 may also be guided synchronously with the workpiece carrier 18; by way of example, mechanical coupling may be provided.

The tool magazine 70 is in particular formed as a pick-up magazine, so that an automatic tool change can be carried out.

The machine tool 10 according to the invention may be provided with a loading portal 74, via which workpieces 22 to be machined can be supplied and fully machined workpieces 22 can be removed from the machine tool 10. For this purpose, following the machining, the workpiece carrier 18 is moved into a removal position, indicated by reference numeral 76 in FIG. 1, from which the loading portal can then remove the workpiece, for example by lifting it in a vertical direction, from a corresponding working space of the machine tool 10 and pass it on to the next machining station.

The machine tool according to the invention functions as described below. If there is a plurality of workpieces 22a, 22b, 22c, 22d, these workpieces are clamped in the corresponding holding device 28 of the workpiece carrier 18, are moved into the appropriate rotary position and the workpiece carrier 18 is then displaced in the displacement direction X in such a way that the correct position for the desired drilling angle is reached. This positioning of the workpiece carrier 18 is, for example, NC-controlled. Furthermore, the drilling tool holder 36, in its pivot bearing 40, is pivoted about the pivot axis 42, in such a way that the correct drilling position is reached. Furthermore, the carriage 50 is displaced in such a way that the correct drilling starting point is reached.

After the appropriate drill bushes 54 have been fitted, the front end 56 of these bushes is moved onto the workpieces 22a, 22b, 22c, 22d. During fixing of the workpieces 22a, 22b, 22c, 22d, the corresponding bearing devices 62 with the bearing surfaces 64 have already been put in place, in such a way that the desired sealing actions are achieved when the drill breaks through.

The tool spindles 34 having the drilling tools 32 are then displaced toward the workpiece 22 by means of a $Z^*$ movement and the drilling tools 32 introduce the deep bores for all the workpieces 22 simultaneously. Cooling/rinsing fluid is forced through the drilling tools 32 at a suitably high pressure, and returned cooling/rinsing fluid discharges drilling chips from the drilling working zone.

The relative pivot position between a workpiece 22 and the drilling tool 32, which is required for introduction of an inclined bore 58, is in this case effected on the one hand by rotation about the axis of rotation 30 on the workpiece carrier 18 and on the other hand by pivoting of the drilling tool holder 36 relative to the machine frame 12. The workpiece carrier 18 is not pivotable with respect to the machine frame 12. This minimizes the displacement paths and in particular allows inclined bores 58 to be introduced into a plurality of workpieces 22 simultaneously.

The height of the machine tool 10 is not increased by the provision of a plurality of drilling tools 32; rather, at most the width of the machine tool is increased.

The solution according to the invention makes it possible to machine workpieces by the provision of five degrees of freedom for the relative movement between tool and workpiece, with the degrees of freedom being the linear movement in the X, Y and $Z^*$ directions and the pivoting movement of the drilling tool holder 36 with the pivot angle B and the rotation of the workpiece about the axis of rotation 30 with rotation angle A.

The invention claimed is:

1. A machine tool for introducing bores into a workpiece, comprising:
    a machine frame;
    a drilling tool holder, which is disposed on the machine frame and has at least one tool spindle; and
    a workpiece carrier which is disposed on the machine frame;
    wherein the workpiece carrier has a holding device for fixing the workpiece by clamping, with the workpiece being rotatable relative to the workpiece carrier about an axis of rotation;
    wherein the drilling tool holder and workpiece carrier are displaceable relative to one another in a displacement direction;
    wherein the drilling tool holder is positioned in such a way that a longitudinal direction of the at least one tool spindle is oriented transversely with respect to a horizontal plane;
    wherein the drilling tool holder is disposed on the machine frame such that it is pivotable relative to the workpiece carrier, so that inclined bores are introducible into the workpiece;
    wherein a pivot axis of the drilling tool holder intersects the axis of rotation of the workpiece; and
    wherein the drilling tool holder is pivotable continuously in a defined angle range about a vertical direction.

2. The machine tool according to claim 1, wherein the workpiece carrier is guided in such a manner that it is displaceable in the displacement direction on the machine frame.

3. The machine tool according to claim 1, wherein the workpiece carrier is guided in a horizontally displaceable manner.

4. The machine tool according to claim 1, wherein the drilling tool holder is pivotable about a pivot axis which is transverse with respect to the displacement direction.

5. The machine tool according to claim 4, wherein the pivot axis is perpendicular to the displacement direction.

6. The machine tool according to claim 4, wherein the pivot axis and the displacement direction together define a horizontal plane.

7. The machine tool according to claim 4, wherein the displacement direction and the pivot axis are each oriented perpendicular to a vertical direction.

8. The machine tool according to claim 1, wherein the defined angle range at least comprises the interval between −25° and +25°, with respect to the vertical direction.

9. The machine tool according to claim 1, wherein a workpiece is fixable to the workpiece carrier in such a way that its longitudinal direction is parallel to the displacement direction.

10. The machine tool according to claim 1, wherein the axis of rotation about which a workpiece is rotatably fixed to the workpiece carrier is oriented parallel to the displacement direction of the workpiece carrier.

11. The machine tool according to claim 1, wherein the drilling tool holder, in any pivotal position, is displaceable in a direction that is parallel to the longitudinal direction of the at least one tool spindle.

12. The machine tool according to claim 1, wherein the drilling tool holder is displaceable in the direction of a pivot axis of the drilling tool holder.

13. The machine tool according to claim 1, wherein the drilling tool holder comprises a plurality of tool spindles disposed parallel to one another.

14. The machine tool according to claim 1, wherein a plurality of workpieces are fixable to the workpiece carrier.

15. The machine tool according to claim 14, wherein when a plurality of workpieces are being machined, these workpieces are fixed horizontally alongside one another on the workpiece carrier.

16. The machine tool according to claim 1, wherein a plurality of workpieces is machinable simultaneously.

17. The machine tool according to claim 1, wherein a relative rotation between a workpiece and a drilling tool is carriable out in order to position the drilling tool relative to the workpiece, the workpiece being rotatable about a longitudinal axis relative to the workpiece carrier, and the drilling tool being pivotable, by means of the drilling tool holder, relative to the workpiece carrier.

18. The machine tool according to claim 1, wherein a drilling tool is formed as a deep-hole drilling tool.

19. The machine tool according to claim 18, wherein a drill bush for each drilling tool is positionable with respect to the workpiece.

20. The machine tool according to claim 19, wherein the positioning of the at least one drill bush is NC-controlled.

21. The machine tool according to claim 19, wherein the positioning of the at least one drill bush is effected resiliently against the associated workpiece.

22. The machine tool according to claim 19, wherein the positioning of the at least one drill bush is effected by means of a drill bush carriage which is moveable relative to the machine frame.

23. The machine tool according to claim 22, wherein the drill bush carriage is moved in a controlled manner relative to the drilling tool holder.

24. The machine tool according to claim 22, wherein the drill bush carriage is moved in a controlled manner relative to the machine frame.

25. The machine tool according to claim 1, wherein a cooling or rinsing fluid flows through a drilling tool.

26. The machine tool according to claim 25, wherein a drill bush is formed in such a way that when it is placed onto the workpiece a seal is produced preventing cooling or rinsing fluid from flowing out.

27. The machine tool according to claim 25, wherein the workpiece carrier is provided with at least one bearing device for a workpiece, which is adapted to be brought to bear against the workpiece in the region where a drill breaks through, in order to block cooling or rinsing fluid from flowing out.

28. The machine tool according to claim 27, wherein the at least one bearing device closes a cooling or rinsing fluid circuit when the drill breaks through.

29. The machine tool according to claim 27, wherein the at least one bearing device has a seal for bearing against the workpiece.

30. The machine tool according to claim 29, wherein the seal is disposed at a blind bore.

31. The machine tool according to claim 1, wherein a tool magazine is guided such that it is displaceable in the displacement direction of the workpiece carrier.

32. A machine tool for introducing bores into a workpiece, comprising:
   a machine frame;
   a drilling tool holder, which is disposed on the machine frame and comprises a plurality of tool spindles disposed parallel to one another;
   a workpiece carrier which is disposed on the machine frame;
   wherein the workpiece carrier has a holding device for fixing the workpiece by clamping, with the workpiece being rotatable relative to the workpiece carrier about an axis of rotation;
   wherein the drilling tool holder and workpiece carrier are displaceable relative to one another in a displacement direction;
   wherein the drilling tool holder is positioned in such a way that a longitudinal direction of the plurality of tool spindles is oriented transversely with respect to a horizontal plane;
   wherein the drilling tool holder is disposed on the machine frame such that it is pivotable relative to the workpiece carrier, so that inclined bores are introducible into the workpiece; and
   wherein a pivot axis of the drilling tool holder intersects the axis of rotation of the workpiece.

33. A machine tool for introducing bores into a workpiece, comprising:
   a machine frame;
   a drilling tool holder, which is disposed on the machine frame and has at least one tool spindle that carries a deep-hole drilling tool;
   a drill bush for each drilling tool positionable with respect to the workpiece; and
   a workpiece carrier which is disposed on the machine frame;
   wherein the workpiece carrier has a holding device for fixing the workpiece by clamping, with the workpiece being rotatable relative to the workpiece carrier about an axis of rotation;
   wherein the drilling tool holder and workpiece carrier are displaceable relative to one another in a displacement direction;
   wherein the drilling tool holder is positioned in such a way that a longitudinal direction of the at least one tool spindle is oriented transversely with respect to a horizontal plane;
   wherein the drilling tool holder is disposed on the machine frame such that it is pivotable relative to the workpiece carrier, so that inclined bores are introducible into the workpiece; and
   wherein a pivot axis of the drilling tool holder intersects the axis of rotation of the workpiece.

34. The machine tool according to claim 33, wherein the positioning of the at least one drill bush is NC-controlled.

35. The machine tool according to claim 33, wherein the positioning of the at least one drill bush is effected resiliently against the associated workpiece.

36. The machine tool according to claim 33, wherein the positioning of the at least one drill bush is effected by means of a drill bush carriage which is moveable relative to the machine frame.

37. The machine tool according to claim 36, wherein the drill bush carriage is movable in a controlled manner relative to the drilling tool holder.

38. The machine tool according to claim 36, wherein the drill bush carriage is movable in a controlled manner relative to the machine frame.

39. A machine tool for introducing bores into a workpiece, comprising:
   a machine frame;
   a drilling tool holder, which is disposed on the machine frame and has at least one tool spindle that carries a drilling tool, wherein a cooling or rinsing fluid flows through the drilling tool;
   a drill bush formed such that when it is placed onto the workpiece a seal is produced preventing cooling or rinsing fluid from flowing out; and
   a workpiece carrier which is disposed on the machine frame;
   wherein the workpiece carrier has a holding device for fixing the workpiece by clamping, with the workpiece being rotatable relative to the workpiece carrier about an axis of rotation;
   wherein the drilling tool holder and workpiece carrier are displaceable relative to one another in a displacement direction;
   wherein the drilling tool holder is positioned in such a way that a longitudinal direction of the at least one tool spindle is oriented transversely with respect to a horizontal plane;
   wherein the drilling tool holder is disposed on the machine frame such that it is pivotable relative to the workpiece carrier, so that inclined bores are introducible into the workpiece; and
   wherein a pivot axis of the drilling tool holder intersects the axis of rotation of the workpiece.

40. The machine tool according to claim 39, wherein the workpiece carrier is provided with at least one bearing device for a workpiece, which is adapted to be brought to bear against the workpiece in the region where a drill breaks through, in order to block cooling or rinsing fluid from flowing out.

41. The machine tool according to claim 40, wherein the at least one bearing device closes a cooling or rinsing fluid circuit when the drill breaks through.

42. The machine tool according to claim 40, wherein the at least one bearing device has a seal for bearing against the workpiece.

43. The machine tool according to claim 42, wherein the seal is disposed at a blind bore.

44. A machine tool according to claim 1, wherein the drilling tool holder is pivotable about the pivot axis relative to the machine frame by means of a pivot bearing.

* * * * *